May 4, 1937.  R. J. GLASS  2,079,445
CONTROL APPARATUS FOR RADIO RECEIVERS
Filed Nov. 24, 1933  3 Sheets-Sheet 1
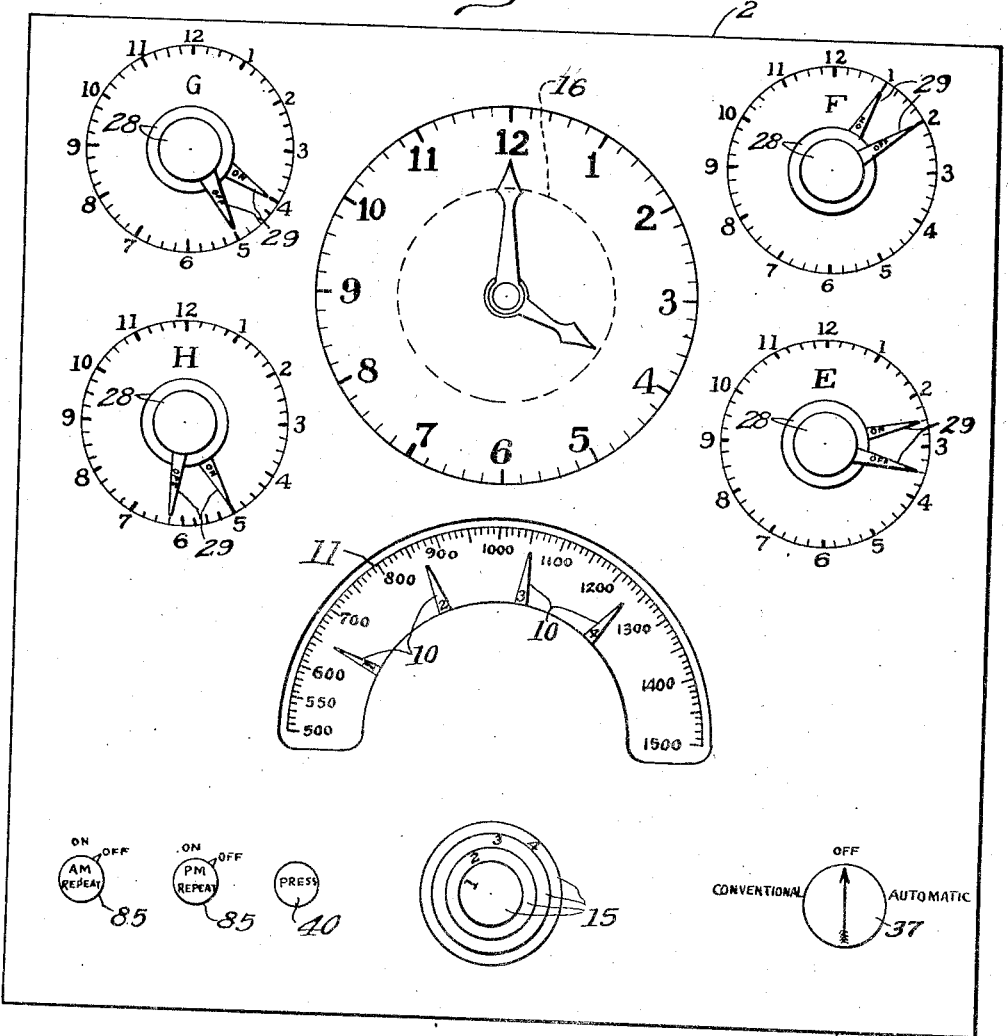
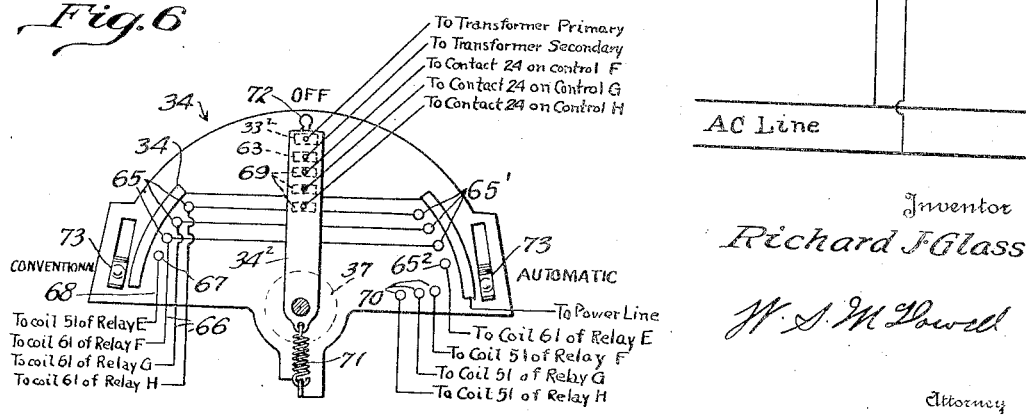
Inventor
Richard J Glass May 4, 1937.   R. J. GLASS   2,079,445
CONTROL APPARATUS FOR RADIO RECEIVERS
Filed Nov. 24, 1933   3 Sheets-Sheet 2
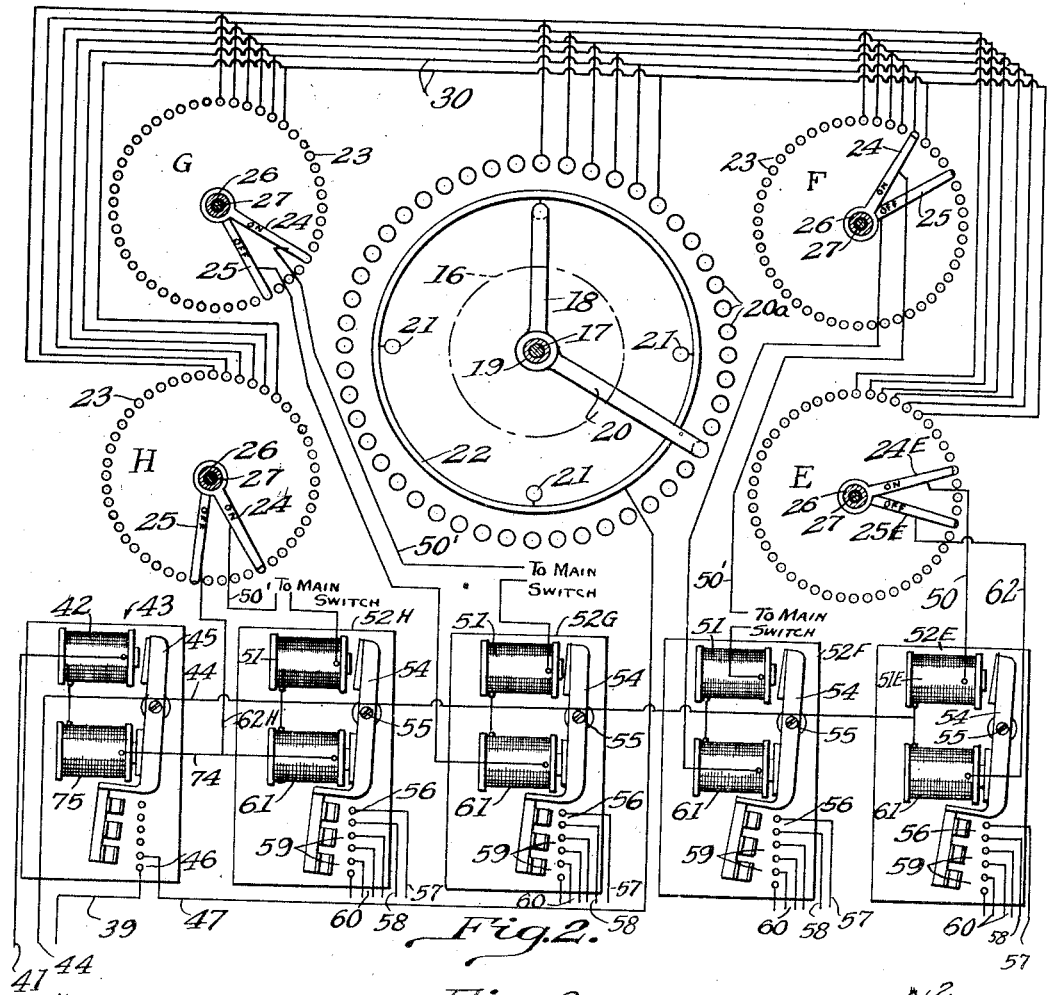
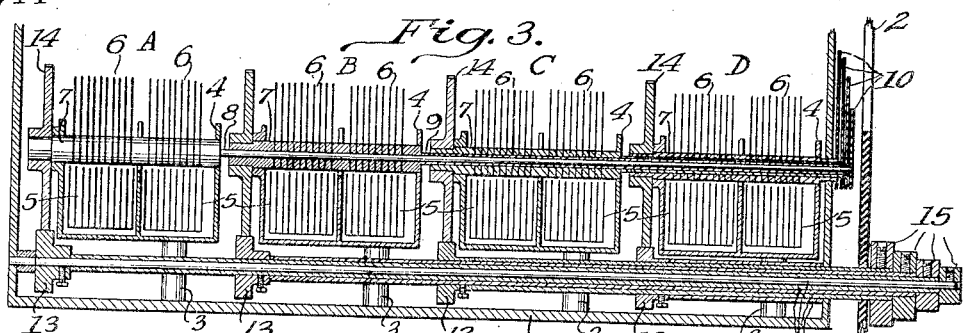
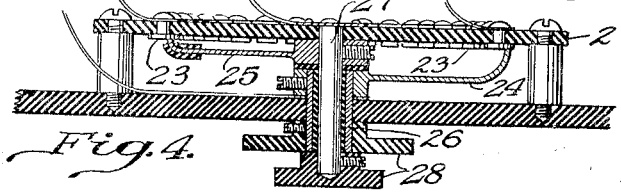
Inventor
Richard J. Glass
W. J. McDowell
Attorney May 4, 1937.   R. J. GLASS   2,079,445
CONTROL APPARATUS FOR RADIO RECEIVERS
Filed Nov. 24, 1933   3 Sheets-Sheet 3
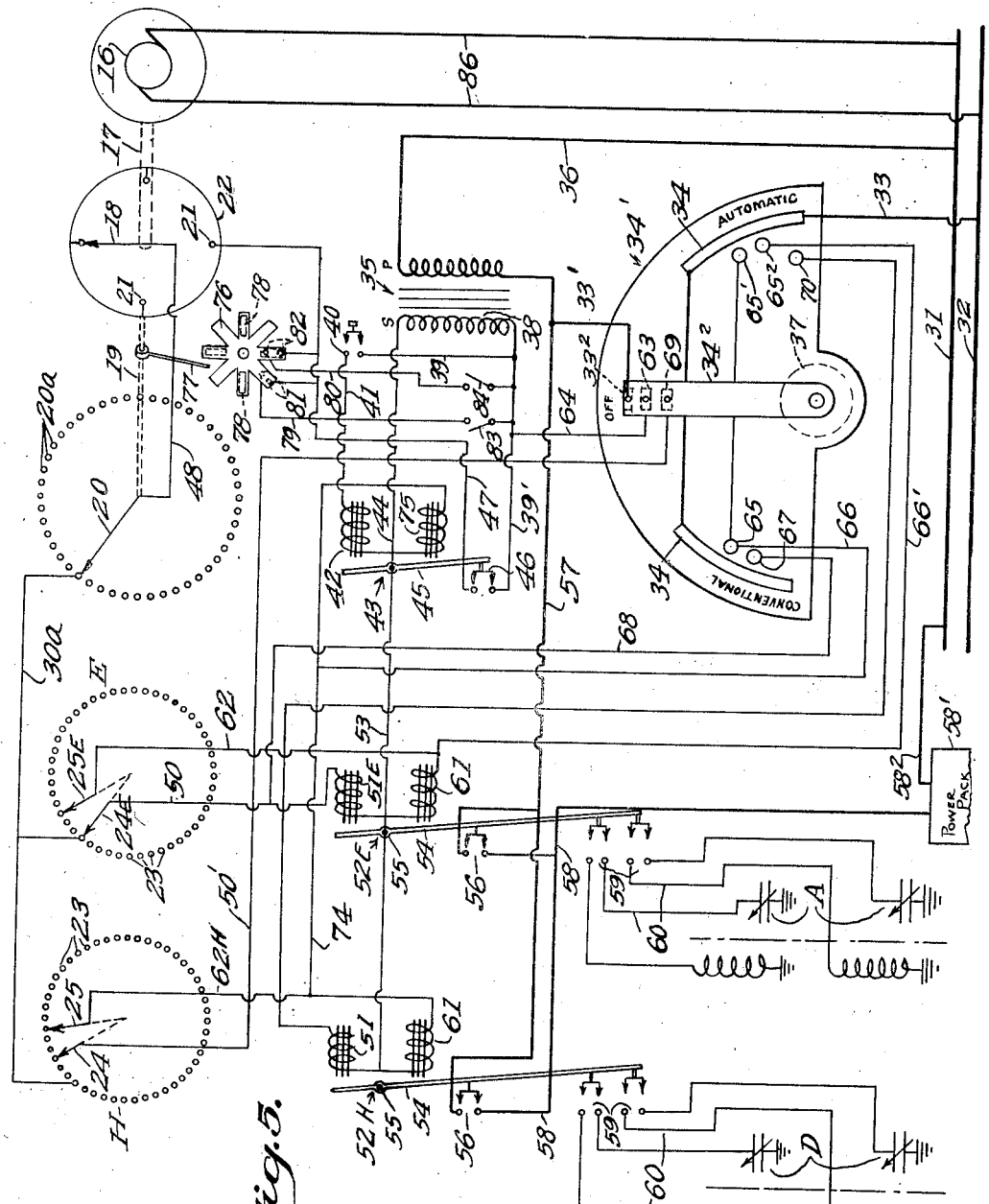
Inventor
Richard J. Glass
By W. S. McDowell
Attorney Patented May 4, 1937

2,079,445

UNITED STATES PATENT OFFICE 2,079,445

CONTROL APPARATUS FOR RADIO RECEIVERS

Richard J. Glass, Columbus, Ohio

Application November 24, 1933, Serial No. 699,543

3 Claims. (Cl. 250—20)

In a generic sense, this invention relates to improvements in time controlled switch mechanism for effecting the automatic opening and closing of electrical circuits in predetermined order, and in its more specific aspects, the invention relates to improvements in radio receiving apparatus in which a novel control mechanism is embodied for governing the operation of such apparatus whereby to render it automatically responsive at predetermined intervals of time to different broadcasting stations.

An object of the invention resides in the provision of control mechanism to automatically operate radio or television receiving units, or other apparatus, at predetermined times for obtaining and reproducing selected programs, thereby making it possible to receive one or more sequential programs from different stations broadcasting on different frequencies at any desired time or length of time measured, preferably, in periods of fifteen minutes each, or combinations of such periods, the invention providing a readily adjusted means for outlining an entire evening's radio program from one or more stations so that each program will be automatically turned on at a specific time and off at a specific time, in accordance with the respective manually effected settings of the control mechanism.

A further object of the invention resides in the provision of apparatus of the character indicated which is adapted to be operated in connection with a clock or other time-control mechanism and to function through the provision of electrical circuits and switches to operate the radio or television units, or other devices.

In accordance with the present invention, there is utilized radio receiving apparatus in which is embodied a plurality of station selectors or tuning units, each of said selectors or units being constructed for selective and independent operation to adapt the apparatus to the wave lengths of different broadcasting stations, and to provide in combination with such selectors time-controlled switch mechanism for automatically regulating the opening and closing of the selector circuits to secure successive operation of the circuits and response of the station selectors or tuning units to desired radio programs.

I am aware of the fact that it has been proposed heretofore to provide manually set mechanism for automatically regulating radio receiving apparatus so that the latter may successively receive and reproduce, without further manual adjustment, a series of successive radio programs. In such prior apparatus, however, but a single station selector or tuning unit is employed and the automatic control mechanism functions to turn or otherwise adjust the single selector or tuning unit to make it responsive to different radio stations or carrier wave lengths. Such prior devices have not proven satisfactory largely for the reason that it is very difficult to obtain the required accuracy of adjustment on the part of the station selector or tuning unit when automatically adjusted and, furthermore, such prior devices have been considered too complicated mechanically and the results therefore too uncertain to render their use commercially feasible. The present invention, however, is distinguished from such prior apparatus by the fact that it employs in the receiving apparatus a plurality of station selectors or tuning units, such as variable condensers, which are adapted to be individually and manually adjusted so as to be individually and accurately responsive to various broadcasting stations operating on different wave lengths. Then, in connection with these individually operable selectors or tuning units, I employ improved time controlled switch mechanism for automatically opening and closing the control circuits in which the selectors or tuning units are positioned. This avoids any automatic turning of station selector shafts, as in prior apparatus, and assures the operator of proper station response at desired periods.

It is another outstanding feature of the invention to operate the time controlled switch mechanism on fifteen minute periods of time. At present, most commercial broadcasting stations divide their programs into intervals of fifteen minutes or into multiples of such periods. Accordingly, the time controlled switch mechanism of the present invention is correspondingly regulated so that the apparatus may function to receive from a single station a program of fifteen minutes, and/or multiple thereof, whereby at the end of that period such a program may be automatically discontinued, maintained for an additional corresponding period or a second or succeeding program initiated from a different station.

A further object of the invention rests in the provision of electrically operated means wherein movable parts, except for switch settings, are eliminated so that the apparatus will be subject to the control of electrical circuits and free from the mechanical complications present in prior apparatus for this purpose.

For a detailed understanding of the nature, construction and operating features of the present invention, reference is to be had to the following description and the accompanying drawings, wherein:

Fig. 1 is a front elevation of radio receiving apparatus provided with the automatic controlling mechanism constituting the present invention;

Fig. 2 is a diagrammatic view of certain of the circuits employed in connection with the control mechanism;

Fig. 3 is a vertical longitudinal sectional view taken through the station selector assembly;

Fig. 4 is a detail horizontal sectional view taken through one of the setting switches;

Fig. 5 is a schematic view disclosing the wiring diagram of the control mechanism and its associated switches;

Fig. 6 is a similar view of the main control switch.

In the specific embodiment of the invention herein selected for illustration and description, radio receiving apparatus is utilized and which may be of any conventional type employed for the purpose of receiving and electrically reproducing the energy emanating from broadcasting stations. In such apparatus, however, the present invention makes one important departure and that is instead of employing but a single adjustable station selector or tuning unit, I modify such apparatus to embody two or more of such station selectors or tuning units. In Fig. 3, such an assembly has been illustrated which, it will be observed, includes a plurality of variable condensers, designated by the characters A, B, C, and D. Other adjustable selector or tuning devices may be used in lieu of variable condensers, but since such condensers are now widely used as tuning devices in conventional radio receiving instruments, I prefer to employ the same in order to avoid any greater change than is necessary in the circuit arrangement proper of the receiving apparatus. I realize that it has been proposed heretofore to employ a plurality of condensers wherein the rotor sections have been operated from a single longitudinally extending shaft. In the present invention, however, the rotor plates of each condenser may be independently and selectively adjusted with respect to the corresponding plates of the remaining condensers. By this expedient, I can adapt the receiving apparatus through multiple adjustment to the wave lengths of two or more different stations so that the receiving apparatus will be responsive to those stations and I arrange the condensers in automatically controlled circuits so that the desired condenser will become operative at any particular period selected by the operator. In Fig. 3, there has been disclosed a group composed of four variable condensers. It will be understood, however, that this number may be varied, although one or more of such condensers will be employed.

To control the independent and selective adjustment of the variable condensers, the latter are mounted within the cabinet 1 of a radio receiving set, the front wall of the cabinet being designated at 2 and the numeral 3 indicates a supporting bracket or brackets which are arranged within the cabinet for effecting the mounting of the condensers.

As shown, each condenser comprises a frame 4, a plurality of spaced stationary plates 5, and a plurality of intervening movable plates 6 which are adapted to be interposed between the stationary plates to vary the response of a radio receiving circuit in the customary manner. The movable plates are connected with rotatable arbors 7 suitably mounted in connection with each of the frames 4. The arbor of the condenser A is provided with a forwardly extending elongated shaft 8 which is telescopically received within the tubular arbors of the condensers B, C and D and extends to a point exterior of the front wall 2. Likewise, the arbor of the condenser B is provided with a reduced forwardly disposed tubular extension 9 which passes through the tubular arbors of the condensers C and D to the exterior of the cabinet, and the same construction is followed out with respect to the condensers C and D, so that the arbors of each of said condensers terminate exteriorly of the wall 2. The forward ends of these telescoping arbors are equipped with indicating hands 10 which, as shown in Fig. 1, are movable over a graduated surface 11, also arranged in the front of the cabinet to indicate wave lengths in meters or kilocycles. Each of the hands 10 is numbered or otherwise characteristically designated to denote the particular condenser or station selector to which it is attached.

To effect the independent adjustment of the movable plates 6 of the station selectors, the bracket 3 supports a plurality of telescoping shafts 12 of different lengths. These tubular shafts terminate at their inner ends in pinions 13 which mesh with gears 14 secured to the arbors 7. The outer ends of the shafts 12 project through the front wall 2 and have secured thereto actuating knobs 15. These knobs are preferably of different diameter so that the operator may selectively actuate for adjustment any one of the station selectors. The knobs 15 likewise bear suitable distinguishing indicia to facilitate the adjustment of a desired selector. For instance, if the knob 15 marked 1 is rotated, the plates of the selector A will be rotated, and the degree of rotation may be noted by the operator through the movement of the hand 10, also marked 1 with relation to the graduated surface 11. This construction provides for a compact grouping of the selector controls, and enables each selector to be manually adjusted to procure nicety of response to the wave length of a particular station or stations and the multiple or gang condensers disclosed are readily adaptable to standard radio circuits.

Following the setting of the station selectors to "bring in" desired broadcasting stations or radio programs, the present invention provides means for automatically opening and closing the circuits in which the several condensers are situated in accordance with predetermined periods of reception so that the apparatus will respond automatically to reproduce a plurality of radio programs in accordance with a desired chronological order. A very simple yet practical way for accomplishing this purpose is to provide the cabinet 1 with a clock mechanism 16 which may be either mechanically or electrically operated. As shown in Fig. 2, the minute shaft 17 of the clock mechanism 16 is equipped with a switch arm 18 which moves in unison with the minute shaft and therefore will complete its orbit of rotation once every hour. The hour shaft 19 of the clock mechanism is likewise equipped with a longer contact arm 20, which latter, by being rigidly attached to the hour shaft, will effect a complete revolution once in twelve hours. Cooperative with the switch arm 18 are four equidistantly spaced contacts 21 which are carried by a ring 22 disposed concentrically of the shaft 17. The spacing of the contacts 21 is such that the arm 18 will engage with one of said contacts every fifteen minutes. A series of spaced concentrically arranged contacts 20a, forty-eight in number, surround the ring 22 and are arranged for engagement with the outer end of the hour hand or arm 20.

As shown in Fig. 2, condenser circuit controls E, F, G, and H are provided in connection with the sub-panel 2', and which are preferably arranged adjacent to the clock mechanism controls. The controls E, F, G, and H are utilized for regulating the operation respectively of the station selectors A, B, C, and D and, of course, correspond in number with that of the station selectors. Each of the controls E, F, G, and H comprises a plurality of stationary button-type contacts 23 arranged in circular order and suitably mounted in the dielectric material from which the sub-panel wall 2' is composed, whereby said contacts are electrically spaced, forty-eight of the stationary contacts 23 being used in each of the control groups. Cooperative with the contacts 23 of each of the control groups are electrically spaced manually rotatable contact arms 24 and 25. As shown in Fig. 4, these arms, which may be formed from a resilient metallic material, are fixed to telescopic shafts 26 and 27. These shafts have their outer ends equipped, in front of the wall 2, with knobs 28, by which said shafts may be selectively rotated to bring the arms 24 and 25 into direct engagement with selected contacts 23. The knobs 28 may, as shown in Fig. 1, carry pointers 29 which are movable over or adjacent to circularly graduated surfaces marked to indicate periods of time, preferably units of fifteen minutes. For instance, if it is desired that condenser A should operate for a period of one hour between four and five o'clock, the control knobs 28 of the control group E are set with the "on" hand pointing to the hour designation four and the "off" hand pointing to the hour designation five. The control mechanism is such that through the operation of the clock 16, the condenser or station selector A will be in operative circuit beginning with four o'clock and terminating at five o'clock. As indicated in Fig. 2, the stationary contacts 20a and also the corresponding stationary contacts 23 are joined by conductor wires 30. That is, the contacts 20a or 23, which are employed to denote for instance the hour of twelve on their respective controls are all joined together by the conductors 30 and likewise similar connection is made by the conductors 30 with the corresponding remaining contacts of said controls.

As shown more particularly in Fig. 5, lead-in conductors are indicated at 31 and 32. From the conductor 32, for instance, a wire 33 extends to the contacts 34 of a main switch 34' and thence to the primary side of a transformer 35 by way of a line 33' connected to a contact 33² carried by the switch arm 34². The return from the primary side of the transformer is indicated by the conductor 36 which leads back to the conductor 31. The switch 34' is disclosed more particularly in Fig. 6 and includes a manually rotatable shaft or knob 37 with which the switch arm 34² is rigidly connected. The knob 37 is disposed exteriorly of the radio cabinet as shown in Fig. 1, and when the arrow on this knob extends to the expression "automatic", one of the contacts 34 will be engaged by the contact 33² completing the circuit to the primary of the transformer.

The secondary windings of the transformer 35 are indicated at 38 and connected with one side of the secondary windings is a conductor 39 which leads to a push button switch 40 of the normally open type. Manual closure of the switch 40 results in the passage of current induced in the secondary circuit of the transformer 35 through a conductor 41 to the windings 42 of a relay switch 43 and after passing through the windings 42, the circuit to the return side of the secondary 38 of the transformer is completed by the conductor 44. The excitation of the field 42 attracts a pivoted armature 45 which effects the closing of a relay switch 46. The push button switch 40 may then be released. The closing of the switch 46 permits induced current of low voltage to travel by way of the conductor 39' through the switch 46, thence by way of a conductor 47 to the ring 22 used in the support of the contacts 21. When the minute hand controlled arm 18 engages with one of the contacts 21, the secondary circuit permits of current flow through the arm 18 and thence by way of a conductor 48 to the hour controlled arm 20 of the clock mechanism 16, thence through one of the contacts 20a and by way of a conductor 30a to one of the contacts 23 of the selector control switch mechanism. The current may then pass through the arm 24 to a conductor 50 and thence through the windings 51 of a relay switch 52E employed for controlling the operation of the station selector A, one of such switches being provided for each station selector and their control centers. After passing through the coil 51, the current is returned to the secondary winding 38 through the conductors 53 and 44. It will be understood that to provide for the passage of the current through the control setting E, there must be correspondence between the manually set positions of the arms 24 or 25 and the hour and minute contact hands 20 and 18 respectively.

Due to the excitation of the coil 51, which is but momentary and is maintained only as long as the arm 18 is in contact with one of the small stationary contacts 21, the armature 54 is attracted toward the pole of said winding 51 and is rocked about its pivotal mounting 55 to effect the closing of a power pack switch 56, by which the radio receiving apparatus receives its main source of electrical energy from the lead-in conductors 31 and 32. In this connection, it will be noted that when the switch 56 is closed, current will pass by way of the conductor 33, through the switch 34', thence by way of the conductor 57 to the switch 56 and thence by way of the conductor 58 to the so-called "power pack", indicated at 58', of the radio receiving apparatus. This power pack will of course vary with each radio receiving circuit and includes the customary transformers for both radio and audio circuits, as well as customary electronic tubes. In view of the fact that such circuits and apparatus are well known and do not enter directly into the present invention, the same are not herein more specifically described nor illustrated. The return from the power pack is designated by the numeral 58², and leads back to the lead 31.

Simultaneously with the closing of the power pack switch 56, the armature 54 of each of the relay switches 52 effects the closing of a pair of condenser switches 59. These switches are disposed in circuits 60 in which are mounted the variable condensers A, B, C, and D. By this arrangement the energizing of the coils 51 of the relay switches 52E, 52F, 52G, and 52H oscillates the armatures 54 of the switches to effect the closing of the radio frequency circuits 60 in which the station selectors or variable condensers are arranged and also the closing of the complemental power pack switches 56 by which electrical energy is supplied to the receiving apparatus to effect its operation. The armatures 54 while of the pivoted type function to maintain their adjusted positions and in this regard may be of the off-center spring held type. For instance, when the field 51 of one of these switches attracts the armature 54 thereto, the position of the armature in its attracted position is maintained, although the winding 51 attracting the armature may be immediately thereafter de-energized. By this arrangement, the secondary circuit which passes through the clock controlled switches and the settings E, F, G, and H, is not maintained for any sustained period, but merely long enough to excite the coils 51 of the relay switches.

When one of the station selectors, for example, the condenser A, has been thrown into operative circuit by the means above described, its operation after a predetermined interval may be automatically discontinued by the excitation of the second winding or field 61 of its respective relay switch 52E. For instance, assuming that the station selector A was thrown into active operation at ten o'clock and it was desired by the operator to discontinue its response thirty minutes later or at ten-thirty. As previously described, the arm 24 was set at the designation ten o'clock on the control E while the arm 25 was manually set to the contact 23 indicating the hour of ten-thirty. It has been previously described how the station selector A was thrown into operation automatically when the hour of ten arrived. Now when the hour of ten-thirty is reached, the hour arm 20 has moved a distance equivalent to two of the contact buttons 20a and engages with this second contact button, which throws the secondary circuit to the arm 25 of the control setting E. This arm, and likewise the corresponding arms on the settings F, G, and H, is connected by means of a conductor 62 with the second fields 61 of the relay switches 52 and thence by way of the return conductors 53 and 44 with the secondary windings of the transformer. The excitation of the field 61 rocks the associated armature 54 in a direction opposed to that previously described, with the result that the associated power pack switch 56 and the condenser switches 59 are opened, thereby immediately discontinuing the activity and response of the station selector A to a given radio program. Then, the control settings F may be so adjusted that their hands 24 and 25 will complete the energizing of the circuits associated with the selector B in exactly the same manner as described in reference to the selector A. The arrangement disclosed provides for the automatic response of four selected and sequentially obtained radio programs of different wave lengths and usually obtained from different broadcasting stations. This number however, is subject to variation and it will be understood that two or more of such selectors and their cooperative circuits may be utilized.

When it is desired to operate the radio set in the ordinary manner, the switch 34' is set, by means of the knob 37, to the position indicated by the word "conventional". As the switch arm 34² is moved to this position, the contact 33² will engage with the second contact 34 which will energize the primary of the transformer as previously described. Another contact 63, carried by the arm 34² and connected to the secondary of the transformer by the line 64, engages a row of stationary contacts 65 connected through the lines 66 and 62 to the coils 61 of the relays 52F, 52G, and 52H. This results in the energizing of these coils and the movement of the armatures to positions opening the switches 56 and 59 and their respective circuits. Upon continued movement of the arm 34², the contact 63 will engage another stationary contact 67, connected by the lines 68 and 50 with the coil 51 of the relay 52 governed by the control E, permitting current to flow through this coil and move its respective armature to a position closing the switches 56 and 59 thus completing the circuits to the power pack and the station selector A. The radio set may then be operated in the usual way. The switch 34' when in the position disclosed in Figs. 5 and 6 occupies its so-called "off" position interrupting all current flow to the apparatus.

As the switch is moved to the position indicated by the word "automatic", the contact 63 will engage with another row of contacts 65' which are connected to the contacts 65 and serve to break the circuits as before mentioned. An additional contact 65² is provided to transmit the current through the line 66' to the coil 61 of the relay 52E to break the circuits controlled thereby. This is done to prevent any possible mix-up in the performance of the set. When the movement of the arm 34² has been completed, additional contacts 69 engage contacts 70 closing circuits from the arms 24 of the controlling devices F, G, and H to the coils 51 of their respective relays. If the "on" switches 24 were connected directly to coil 51 of relays F, G, and H with the arms 24 and 25 of switches 52E, 52F, 52G, and 52H in certain positions, all of the relays will not be thrown in "off" position when the switch 34² is moved to either automatic or conventional position. The connection between 24E and 51E is permanent, on the assumption that 52E, 52F, 52G and 52H will be set in chronological order. It is necessary that all relays be in "off" position when the switch reaches automatic position. To insure the complete movement of the switch arm to either of its positions, a spring 71 is provided to return the arm to the off position unless it is moved far enough to permit a button 72 carried by the arm to engage clips 73 which will hold the latter in either the conventional or automatic setting.

Upon the completion of the final program for which the automatic control is set, it has been found desirable to have the set turned off automatically. To accomplish this, a line 74 leads from the line 62H to a coil 75 provided in connection with the relay 43 and when the time to which the arm 25 of the control H is reached, the coil 75 will be energized attracting the armature 45 which will open the switch 46 and intercept all current flow through the device until the switch 40 is again actuated.

To make this automatic control still more flexible, a time controlled switch is provided which is in the form of an eight-arm wheel 76 rotated one-eighth of a turn every twelve hours by a member 77 secured to the arbor 19. Contact plates 78, carried by alternate arms of the wheel 76, are arranged to close circuits 79 and 80, the former in the a. m. hours and the latter in the p. m. hours, by bridging pairs of contacts 81 and 82 respectively. When it is desired to have the automatic control operate every morning, the switch 83 is closed. If it is desirable to have it operate every evening, the switch 84 is closed and if automatic operation is desired every twelve hours, both switches may be operated. Knobs 85 suitably marked are arranged on the outside of the cabinet for convenient operation of these switches.

The conductors for governing the operation of the electric motor used in the clock mechanism are indicated at 86. It will be understood, however, that this time-controlled switch may be operated by an ordinary spring motor if desired. Other variations will be obvious to those skilled in the art and I therefore claim as my invention all such modifications or variations that may be said to fall fairly within the scope of the following claims.

What is claimed is:

1. In radio receiving apparatus, a plurality of independent receiving circuits, a manually operated device in each of said circuits for independently tuning the latter to radio impulses of varying frequency, means for automatically and selectively governing the response of said circuits for predetermined periods of time comprising a clock driven switch having hour and minute shafts, an arm rotatable with the hour shaft, a plurality of spaced stationary contacts disposed for successive engagement with the arm of the hour shaft, a smaller number of more widely spaced stationary contacts arranged for successive and individual engagement with the arm of the minute shaft, a time setting switch for each of said receiving circuits including spaced stationary contacts and manually adjustable independently movable arms in engagement therewith, corresponding contacts of the time setting switches and the clock driven switch being in direct electrical communication, relay switches for opening and closing said receiving circuits, said relay switches being energized by the passage of current through the clock controlled and time setting switches, and automatic means for positively terminating the actuation of the automatic circuit governing means at the end of a given period of automatic operation of such mechanism.

2. In radio receiving apparatus, a plurality of variable condensers, manually operated means for effecting selectively independent adjustment of said condensers to control their response to radio excitation of varying frequencies, signal-receiving circuits for each of said selectors, a clock operated switch mechanism for automatically and successively effecting the opening and closing of said circuits in predetermined order, said switch mechanism comprising clock-driven hour and minute contact arms, a series of spaced stationary contacts disposed for engagement with the hour contact arm, a smaller number of spaced stationary contacts disposed for engagement with the minute arm, a plurality of time setting switches comprising a plurality of manually adjustable relatively spaced independently movable contact arms and spaced stationary contacts disposed for engagement with said arms, the complemental spaced stationary contacts of the clock operated and time setting switches being in direct electric connection, relay operated switches for said signal-receiving circuits, said relay switches being opened or closed in accordance with the flow of current through the clock operated and manually adjusted time setting switches, and a clearing switch manually adjustable to render inactive all but one of said signal-receiving circuits, whereby to render the apparatus adaptable for non-automatic control.

3. In radio receiving apparatus, a signal receiving circuit, a plurality of manually operated tuning devices, time controlled means for automatically connecting each of said tuning devices with said signal receiving circuit in successive order, said time controlled means comprising a clock driven master switch including an hour shaft and a minute shaft, an arm rotatable with each of said shafts, a plurality of spaced stationary contacts engaged successively by the arm on said hour shaft, a smaller number of more widely spaced contacts engaged by the arm on said minute shaft, a relay switch for each of said tuning devices, said relay switches each including a pair of electromagnetic coils, a control switch for each of said relay switches, each of said control switches including a pair of adjustable arms insulated from one another, a row of spaced contacts corresponding in number to the contacts engaged by the arm on said hour shaft and connected therewith, and connections between the arms of said control switches and the electromagnetic coils of said relay switches.

RICHARD J. GLASS.